(12) United States Patent
Horiuchi et al.

(10) Patent No.: US 8,928,983 B2
(45) Date of Patent: Jan. 6, 2015

(54) DISPLAY APPARATUS, MOVING BODY, AND METHOD FOR MOUNTING DISPLAY APPARATUS

(71) Applicant: Kabushiki Kaisha Toshiba, Tokyo (JP)

(72) Inventors: Kazuo Horiuchi, Kanagawa-ken (JP); Haruhiko Okumura, Kanagawa-ken (JP); Takashi Sasaki, Kanagawa-ken (JP); Aira Hotta, Kanagawa-ken (JP); Naotada Okada, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/747,926

(22) Filed: Jan. 23, 2013

(65) Prior Publication Data

US 2013/0194674 A1 Aug. 1, 2013

(30) Foreign Application Priority Data

Jan. 31, 2012 (JP) .................................. 2012-019083

(51) Int. Cl.
*G02B 27/14* (2006.01)
*G02B 27/01* (2006.01)
*G02B 5/10* (2006.01)

(52) U.S. Cl.
CPC .............. *G02B 27/0101* (2013.01); *G02B 5/10* (2013.01); *G02B 2027/0123* (2013.01)
USPC ....................................................... 359/630

(58) Field of Classification Search
USPC ....................................................... 359/630
See application file for complete search history.

(56) References Cited

U.S. PATENT DOCUMENTS

| | | | |
|---|---|---|---|
| 8,629,887 B2 | 1/2014 | Sasaki et al. | |
| 2009/0135374 A1 | 5/2009 | Horiuchi et al. | |
| 2009/0153962 A1 | 6/2009 | Okada et al. | |
| 2009/0201225 A1 | 8/2009 | Okada et al. | |
| 2009/0237803 A1 | 9/2009 | Hotta et al. | |
| 2009/0243963 A1* | 10/2009 | Hotta et al. | 345/7 |
| 2009/0244702 A1 | 10/2009 | Okada et al. | |
| 2010/0066832 A1 | 3/2010 | Nagahara et al. | |
| 2010/0066925 A1 | 3/2010 | Nagahara et al. | |
| 2010/0066984 A1 | 3/2010 | Horiuchi et al. | |
| 2010/0073579 A1 | 3/2010 | Okada et al. | |
| 2010/0073636 A1 | 3/2010 | Sasaki et al. | |
| 2010/0073773 A1 | 3/2010 | Hotta et al. | |
| 2010/0157430 A1 | 6/2010 | Hotta et al. | |

(Continued)

FOREIGN PATENT DOCUMENTS

| | | |
|---|---|---|
| EP | 2412557 A1 | 2/2012 |
| JP | 2009-251194 | 10/2009 |

(Continued)

*Primary Examiner* — James Jones
(74) *Attorney, Agent, or Firm* — Amin, Turocy & Watson, LLP

(57) ABSTRACT

According to one embodiment, a display apparatus projects a light flux including image information toward one eye. The apparatus includes an image formation unit and a projection unit. The image formation unit is configured to emit the light flux. The projection unit includes a projection region limiting unit and a semi-transmissive reflective unit. The projection region limiting unit is configured to limit a width of the light flux emitted from the image formation unit. The semi-transmissive reflective unit is configured to reflect the light flux emitted from the projection region limiting unit. A distance between the semi-transmissive reflective unit and an imaging plane of the light flux is not more than 250 mm.

19 Claims, 10 Drawing Sheets

(56) References Cited

U.S. PATENT DOCUMENTS

| | | |
|---|---|---|
| 2010/0164702 A1 | 7/2010 | Sasaki et al. |
| 2010/0214635 A1 | 8/2010 | Sasaki et al. |
| 2011/0001639 A1 | 1/2011 | Sasaki et al. |
| 2011/0187844 A1 | 8/2011 | Ogawa et al. |
| 2011/0216096 A1 | 9/2011 | Sasaki et al. |
| 2011/0228403 A1 | 9/2011 | Masuda et al. |
| 2011/0298693 A1 | 12/2011 | Tasaki et al. |
| 2012/0008048 A1 | 1/2012 | Sekine et al. |
| 2012/0075708 A1 | 3/2012 | Hagiwara et al. |
| 2012/0169591 A1 | 7/2012 | Moriya et al. |
| 2012/0170130 A1 | 7/2012 | Sasaki et al. |
| 2012/0242694 A1 | 9/2012 | Hotta et al. |
| 2012/0268351 A1* | 10/2012 | Sasaki et al. ............ 345/8 |
| 2013/0027426 A1 | 1/2013 | Sasaki et al. |

FOREIGN PATENT DOCUMENTS

| | | |
|---|---|---|
| WO | 2011016079 | 2/2011 |
| WO | 2011033766 | 3/2011 |
| WO | 2011070738 | 6/2011 |
| WO | 2011108091 | 9/2011 |
| WO | 2011125135 | 10/2011 |

* cited by examiner

DISPLAY APPARATUS, MOVING BODY, AND METHOD FOR MOUNTING DISPLAY APPARATUS

CROSS-REFERENCE TO RELATED APPLICATIONS

This application is based upon and claims the benefit of priority from the prior Japanese Patent Application No. 2012-019083, filed on Jan. 31, 2012; the entire contents of which are incorporated herein by reference.

FIELD

Embodiments described herein relate generally to a display apparatus, a moving body, and a method for mounting the display apparatus.

BACKGROUND

Automotive display apparatuses include a head-up display (HUD) in which operation information such as the vehicle speed, travel direction instructions, etc., are viewed by being projected onto a combiner such that the operation information and external environment information are visually confirmed simultaneously.

There is a monocular HUD in which the display image is visually confirmed with one eye. In a display apparatus such as a monocular HUD in which the display region (the viewable region) is narrow, a special optical system is necessary to limit the projection region of the emitted light. It is desirable for the HUD to provide a display that is easy to view.

DETAILED DESCRIPTION

Figure 1:
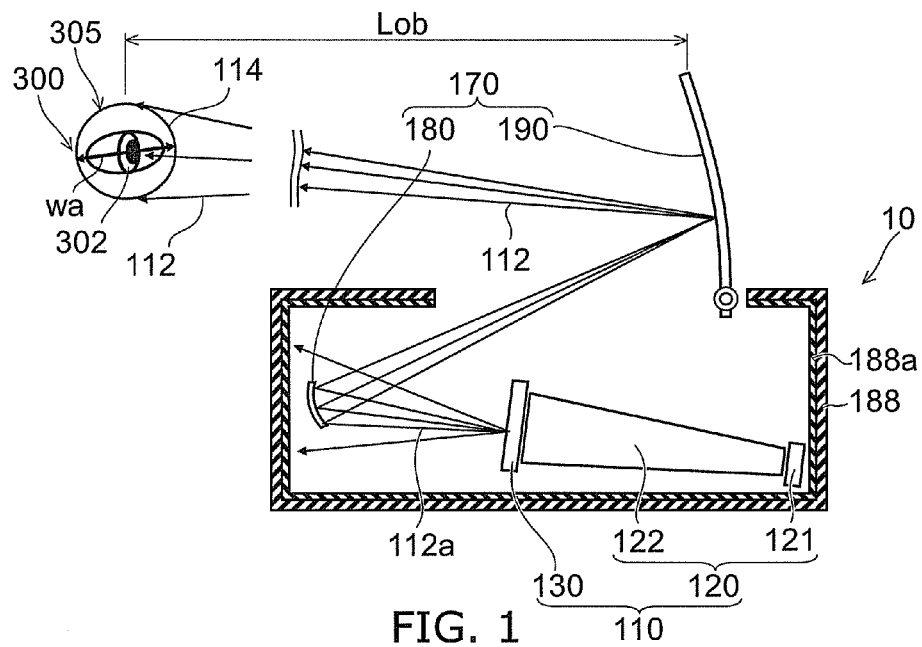
FIG. 1 is a schematic view illustrating the configuration of a display apparatus according to a first embodiment.

According to one embodiment, a display apparatus projects a light flux including image information toward one eye. The apparatus includes an image formation unit and a projection unit. The image formation unit is configured to emit the light flux. The projection unit includes a projection region limiting unit and a semi-transmissive reflective unit. The projection region limiting unit is configured to limit a width of the light flux emitted from the image formation unit. The semi-transmissive reflective unit is configured to reflect the light flux emitted from the projection region limiting unit. A distance between the semi-transmissive reflective unit and an imaging plane of the light flux is not more than 250 mm.

According to another embodiment, a moving body includes a display apparatus for one eye and a vehicle body. The display apparatus is mounted in the vehicle body. The display apparatus includes an image formation unit and a projection unit. The image formation unit is configured to emit a light flux including image information. The projection unit includes a projection region limiting unit and a semi-transmissive reflective unit. The projection region limiting unit is configured to limit a width of the light flux emitted from the image formation unit. The semi-transmissive reflective unit is configured to reflect the light flux emitted from the projection region limiting unit. A distance between the semi-transmissive reflective unit and an imaging plane of the light flux is not more than 250 mm.

According to another embodiment, a method is disclosed for mounting a display apparatus. The method can include mounting a display apparatus for one eye with a distance between an imaging plane of the light flux emitted from the projection region limiting unit and a semi-transmissive reflective unit configured to reflect the light flux emitted from the projection region limiting unit being 250 mm. The display apparatus includes an image formation unit and a projection unit. The image formation unit is configured to emit a light flux including image information. The projection unit includes a projection region limiting unit configured to limit a width of the light flux emitted from the image formation unit.

Various embodiments will be described hereinafter with reference to the accompanying drawings.

The drawings are schematic or conceptual; and the relationships between the thicknesses and the widths of portions, the proportions of sizes between portions, etc., are not necessarily the same as the actual values thereof. Further, the dimensions and/or the proportions may be illustrated differently between the drawings, even for identical parts.

In the drawings and the specification of the application, components similar to those described in regard to a drawing thereinabove are marked with like reference numerals, and a detailed description is omitted as appropriate.

First Embodiment

FIG. 1 is a schematic view illustrating the configuration of a display apparatus according to a first embodiment.

As illustrated in FIG. 1, the display apparatus 10 according to the embodiment includes an image formation unit 110 and a projection unit 170.

In this example, the image formation unit 110 includes a light source 120 and a light flux modulator 130. The light source 120 includes a light producing device 121 and a tapered light guide 122.

The light producing device 121 emits light. The light producing device 121 may include, for example, an LED (Light Emitting Diode), etc. The light producing device 121 may include various light emitting devices that produce light such as a lamp, various lasers, etc.

The tapered light guide 122 may include an optically transmissive resin, glass, etc. For example, the tapered light guide 122 has a truncated quadrilateral pyramid configuration. The upper surface (the surface having a surface area smaller than that of the bottom surface) of the truncated quadrilateral pyramid opposes the light producing device 121. The light emitted from the light producing device 121 is incident on the upper surface (the incident surface) of the tapered light guide 122. The tapered light guide 122 guides the light that is incident on the upper surface. The light that is incident on the upper surface of the tapered light guide 122 reaches the bottom surface by being reflected by the oblique surfaces (the surfaces that link the upper surface and the bottom surface) of the truncated quadrilateral pyramid; and the light is emitted from the bottom surface (the emission surface). The diffusion angle of the light flux emitted from the tapered light guide 122 is smaller than the diffusion angle of the light that is incident. The tapered light guide 122 increases the uniformity in the plane of the light flux emitted from the tapered light guide 122. Also, the tapered light guide 122 has the effect of widening the illumination region. The tapered light guide 122 may be omitted in the cases where the diffusion angle of the light emitted from the light producing device 121 is small, the luminance in the plane is relatively uniform, etc.

The light flux modulator 130 is arranged inline with the light source 120. For example, the light flux modulator 130 includes multiple pixels disposed in a matrix configuration. The light flux modulator 130 may include, for example, a liquid crystal display panel. The embodiment is not limited thereto; and various devices for displaying such as a DMD (Digital Mirror Device), etc., may be used.

The light flux that emerges from the light source 120 (for example, the light flux that emerges from the tapered light guide 122) is incident on the light flux modulator 130. The light flux modulator 130 produces light flux 112*a* including image information by modulating the light emitted from the light source 120. In other words, the light flux modulator 130 provides the image information to the light that is incident on the light flux modulator 130.

A self-luminous device such as an organic EL display panel, etc., may be used as the light flux modulator 130. In such a case, the light source 120 may be omitted.

The case will now be described where the image formation unit 110 includes the light source 120 that includes an LED light producing device 121 and the tapered light guide 122, and a liquid crystal display panel is used as the light flux modulator 130.

The projection unit 170 includes a projection region limiting unit 180 and a semi-transmissive reflective unit 190.

In this example, the projection region limiting unit 180 includes a reflector. Specifically, a concave mirror is used as the projection region limiting unit 180. The concave mirror has the effect of a mirror and the effect of a lens. Compared to the case where a plane mirror is used, the image can be enlarged by using the concave mirror. The reflective surface of the concave mirror is mounted to oppose the light flux modulator 130 and the semi-transmissive reflective unit 190.

The semi-transmissive reflective unit 190 reflects the light that is incident on the semi-transmissive reflective unit 190. The semi-transmissive reflective unit 190 may include, for example, a metal thin film or a dielectric thin film. The semi-transmissive reflective unit 190 may include a stacked body of multiple films having different refractive indexes. The semi-transmissive reflective unit 190 may have optical power.

A portion of the light flux 112*a* emitted from the image formation unit 110 is incident on the projection region limiting unit 180. The light flux 112*a* that is incident on the projection region limiting unit 180 is reflected by the projection region limiting unit 180 to be incident on the semi-transmissive reflective unit 190. The light of the light flux 112*a* that is not incident on the projection region limiting unit 180 is not incident on the semi-transmissive reflective layer 190 and is not used in the display.

The display apparatus 10 further includes a housing 188. The housing 188 contains the image formation unit 110 and the projection region limiting unit 180. For example, the semi-transmissive reflective unit 190 is mounted to the housing 188. A state is maintainable in which at least a portion of the semi-transmissive reflective unit 190 protrudes above the housing 188. A light absorption layer 188*a* is provided on the inner surface of the housing 188. The light of the light flux 112*a* that is not incident on the projection region limiting unit 180 is incident on the light absorption layer 188*a* and is absorbed by the light absorption layer 188*a*. Thereby, only the light of the light flux 112*a* that is incident on the projection region limiting unit 180 is reflected by the projection region limiting unit 180 to travel toward the semi-transmissive reflective unit 190 as light flux 112. In this example, the width of the light flux 112 emitted from the image formation unit 110 is limited by the light absorption layer 188*a* and the reflector (e.g., the concave mirror) included in the projection region limiting unit 180.

The width of the light flux 112 is the width when the light flux 112 is cut by a plane substantially perpendicular to the optical axis of the light flux 112. The projection region limiting unit 180 limits the spread angle, i.e., the diffusion angle, of the light flux 112. As described below, the light flux 112 is projected toward the head 305 of a human viewer 300 (the user of the display apparatus 10) that views the image information. In such a case, the projection region limiting unit 180 limits at least the width of the light flux 112 in the lateral direction when viewed by the human viewer 300.

The semi-transmissive reflective unit 190 reflects the light flux 112 from the projection region limiting unit 180. The light flux 112 reflected by the semi-transmissive reflective unit 190 is incident on an eye 302 of the human viewer 300 (specifically, one eye). By limiting the width of the light flux 112 by the projection region limiting unit 180 as recited above, a state is obtained in which the light flux 112 is not projected toward both eyes of the human viewer 300 and the light flux 112 is incident on the one eye 302.

The projection region limiting unit 180 limits an eye range 114. The eye range 114 is the region where the image that is presented by the display apparatus 10 can be viewed and corresponds to the projection region of the light flux 112. In the display apparatus 10, a width wa of the eye range 114 in the lateral direction at the position of the head 305 of the human viewer 300 is limited to be not more than 70 mm. The width wa of the eye range 114 may be adjustable based on the spacing of the centers of the pupils of the human viewer 300 that uses the display apparatus 10. For example, in the case where the spacing of the centers of the pupils of the human viewer 300 is 65 mm, the width wa is set to be less than 65 mm. The display apparatus 10 is a display apparatus for one eye.

In the display apparatus 10, the imaging plane of the light flux 112 is proximal to the semi-transmissive reflective unit 190. For example, the distance between the semi-transmissive reflective unit 190 and the imaging position of the light flux 112 (the position of the imaging plane) is shorter than the distance between the imaging position of the light flux 112 and the eye 302 of the human viewer 300. For example, the distance between the semi-transmissive reflective unit 190 and the imaging position of the light flux 112 is not more than ½ of a distance Lob between the semi-transmissive reflective unit 190 and the eye 302 of the human viewer 300.

The projection region limiting unit 180 is disposed between the light flux modulator 130 and the semi-transmissive reflective unit 190 on the optical path of the light flux 112. The position of the light flux modulator 130 and the position of the semi-transmissive reflective unit 190 substantially have an imaging relationship. The image (the real image) formed by the image formation unit 110 (in this example, the light flux modulator 130) is imaged at the position of the semi-transmissive reflective unit 190 (a position proximal to the semi-transmissive reflective unit 190).

In the display apparatus 10, the light flux including the image information is produced by the image formation unit 110 (in this example, the light flux modulator 130); and the light flux is incident on the projection region limiting unit 180. The projection region limiting unit 180 reflects the light flux 112 while limiting the width of the light flux 112 and causes the light flux 112 to be incident on the semi-transmissive reflective unit 190. The light flux 112 that is reflected by the semi-transmissive reflective unit 190 is incident on the one eye 302 of the human viewer 300. The human viewer 300 views the image that is imaged proximally to the semi-transmissive reflective unit 190 as the image information.

Figure 2:
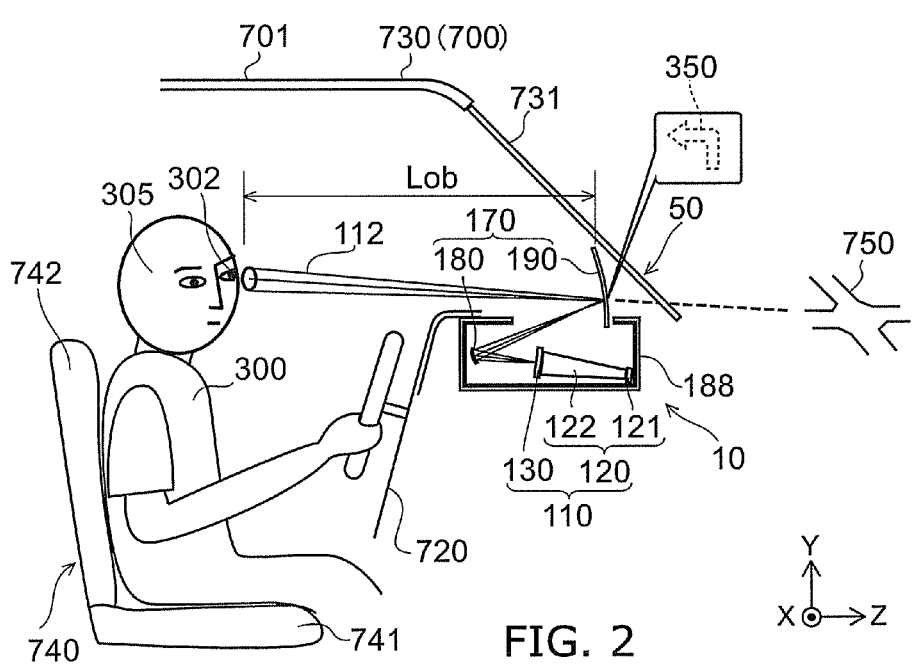
FIG. 2 is a schematic view illustrating a state of use of the display apparatus according to the first embodiment.

FIG. 2 is a schematic view illustrating a state of use of the display apparatus according to the first embodiment.

As illustrated in FIG. 2, the display apparatus 10 according to the embodiment is mounted in a moving body 700 (e.g., a vehicle 730). For example, the display apparatus 10 is provided in the interior of a dashboard 720 of the vehicle 730. The display apparatus 10 may be disposed on the dashboard 720. The semi-transmissive reflective unit 190 is disposed proximally to a windshield unit 731 (a windshield) of the vehicle 730. In this example, the display apparatus 10 is used as a head-up display 50 for a vehicle.

The moving body 700 includes a vehicle body 701 (an enclosing unit of the moving body, etc.) in which the display apparatus 10 is mounted, and a seat 740. The seat 740 is provided inside the vehicle body 701. The seat 740 includes a seating unit 741 and a backrest unit 742. For example, the backrest unit 742 is linked to the seating unit 741.

In the case where the display apparatus 10 is mounted in the vehicle 730, the human viewer 300 is, for example, the operator of the vehicle 730. The human viewer 300 sits in the seat 740 of the vehicle 730. The human viewer 300 views a background image 750 of the external environment of the vehicle 730 via the semi-transmissive reflective unit 190. An image 350 that is formed of the light flux 112 that is projected by being reflected by the semi-transmissive reflective unit 190 is superimposed onto the background image 750. The human viewer 300 can simultaneously view the background image 750 and the image 350 that is displayed. The semi-transmissive reflective unit 190 transmits the light including the background image 750 while reflecting the light flux 112 including the image 350. The semi-transmissive reflective unit 190 functions as a combiner.

In the case where the display apparatus 10 is used as the head-up display 50 for a vehicle, operation information that instructs the travel direction, etc., may be used as the image information. For example, in one application example of the display apparatus 10, the image 350 of an arrow of a travel direction change, etc., is displayed at a position superimposed onto the background image 750 of an intersection of the external environment where the travel direction is to be changed. A display that is easier to perceive is possible by displaying the image 350 of the arrow, etc., superimposed onto the position of the background image 750 of the external environment corresponding to the image 350.

A HUD that is viewed by both eyes is difficult to view because the depthward position of the background image 750 is different from the depthward position of the virtual image of the image 350; and binocular parallax occurs. Also, time is necessary to change the convergence of the eyes between when viewing the background image 750 and when viewing the image 350; and it is difficult to instantaneously visually confirm the image 350 or the background image 750. To reduce this difficulty of viewing in a binocular HUD, the image 350 (the virtual image) that is formed is disposed at a position that is not less than 1500 mm away as viewed by the human viewer 300. However, even in the case where the image plane of the image 350 (in this example, the virtual image plane) is separated from the human viewer 300 by a constant distance or more, the difficulty of viewing such as that recited above is not eliminated sufficiently.

Conversely, in the display apparatus 10 according to the embodiment, the width of the light flux 112 is limited by the projection region limiting unit 180; and the image 350 is visually confirmed using the one eye 302. Therefore, the difficulty of viewing due to binocular parallax does not occur.

Further, in the display apparatus 10, the imaging plane of the light flux 112 is disposed proximally to the semi-transmissive reflective unit 190. Thereby, the image 350 can be displayed for easy viewing. Further, the apparatus can be downsized.

First, the downsizing will be described.

In the display apparatus 10 according to the embodiment, the size of the semi-transmissive reflective unit 190 can be smaller than that of the binocular HUD because the light flux 112 is caused to be incident on the one eye 302 and the eye range 114 is small. Also, the size of the semi-transmissive reflective unit 190 can be reduced further by causing the light flux 112 to be imaged at a position proximal to the semi-transmissive reflective unit 190. The size necessary for the semi-transmissive reflective unit 190 will now be described.

For convenience of description herein, a direction moving away from the human viewer 300 toward the semi-transmissive reflective unit 190 is taken as a Z-axis direction. A direction perpendicular to the Z-axis direction from the left toward the right as viewed by the human viewer 300 is taken as an X-axis direction. A direction perpendicular to the Z-axis direction and the X-axis direction is taken as a Y-axis direction (corresponding to a direction upward from below as viewed by the human viewer 300).

Figure 3:
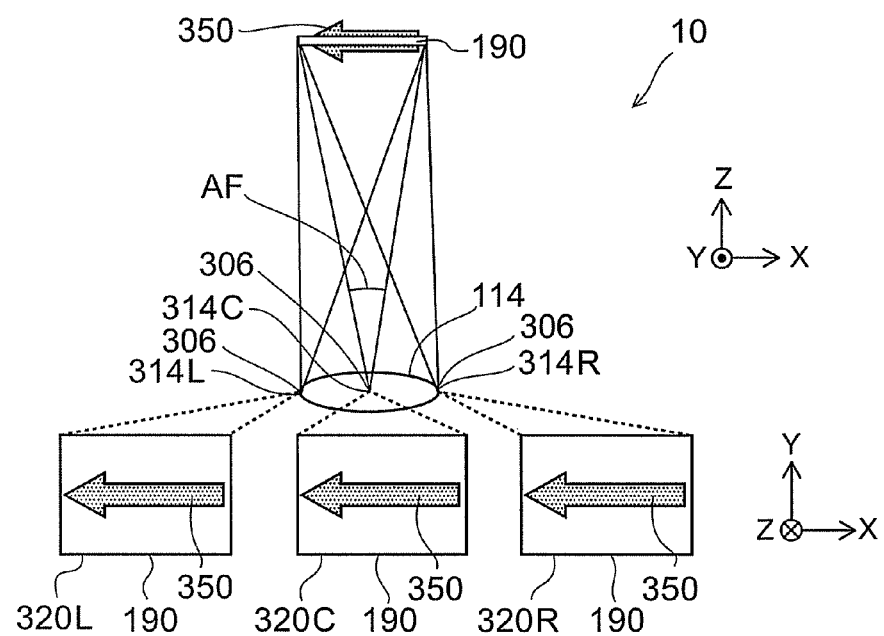
FIG. 3 is a schematic view illustrating characteristics of the display apparatus according to the first embodiment.

FIG. 3 is a schematic view illustrating characteristics of the display apparatus according to the first embodiment.

FIG. 3 illustrates the positional relationship and the relationship between the sizes of the eye range 114, the image 350, and the semi-transmissive reflective unit 190 of the display apparatus 10 and the appearance of the image 350 when a viewpoint 306 (the position of the eye 302 of the human viewer 300) moves.

The viewpoint 306 is disposed within the range of the eye range 114. The image 350 (in this example, an arrow) is imaged at the position of the semi-transmissive reflective unit 190. Here, the image 350 has an angle of view AF. In the case where the viewpoint 306 is at a center position 314C of the eye range 114, the center of the image 350 is disposed at the center of the semi-transmissive reflective unit 190. The size (the width in the lateral direction) of the image 350 at the image plane imaged at the position of the semi-transmissive reflective unit 190 is determined by the angle of view AF and the distance between the semi-transmissive reflective unit 190 and the eye 302 of the human viewer 300.

Here, in a state 320C in which the viewpoint 306 is at the center position 314C of the eye range 114, one edge (one lateral-direction edge) of the image 350 is positioned at one edge of the semi-transmissive reflective unit 190; and the other edge (the other lateral-direction edge) of the image 350 is positioned at the other edge of the semi-transmissive reflective unit 190.

In a state 320L in which the viewpoint 306 is at a left edge position 314L of the eye range 114 as viewed by the human viewer 300, the position of the image 350 inside the semi-transmissive reflective unit 190 (inside the image plane) is the center and does not change because the light flux 112 (the image 350) is imaged at the position of the semi-transmissive reflective unit 190.

Similarly, in a state 320R in which the viewpoint 306 is at a right edge position 314R of the eye range 114 as viewed by the human viewer 300, the position of the image 350 inside the semi-transmissive reflective unit 190 is the center and does not change.

Therefore, in the display apparatus 10 according to the embodiment, the minimum value of the size (the width in the lateral direction) of the semi-transmissive reflective unit 190 is the size (the width in the lateral direction) of the image 350 of the angle of view AF.

Figure 4:
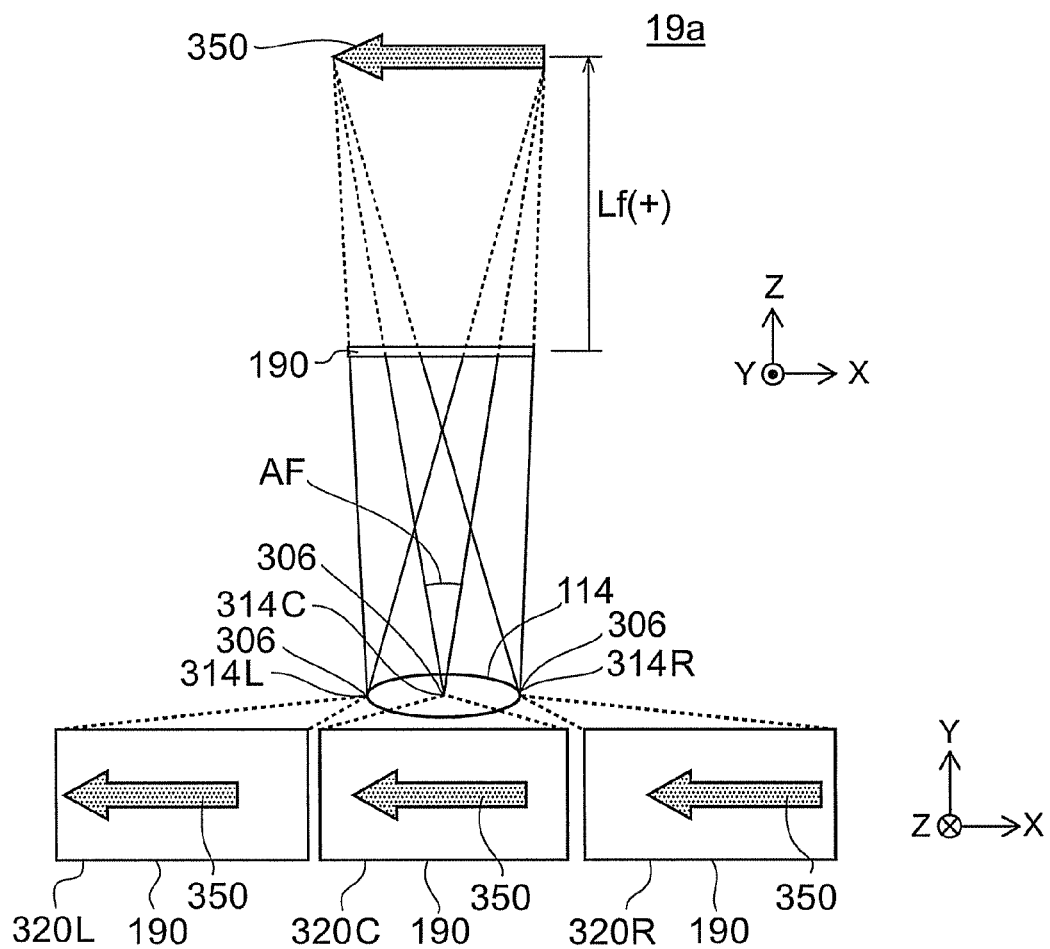
FIG. 4 is a schematic view illustrating characteristics of a display apparatus of a reference example.

FIG. 4 is a schematic view illustrating characteristics of a display apparatus of a reference example.

In the display apparatus 19a, the image 350 that is imaged is more distal than the semi-transmissive reflective unit 190 as viewed by the human viewer 300. Here, the distance between the semi-transmissive reflective unit 190 and the imaging position (the position of the imaging plane) of the image 350 is taken as an image plane distance Lf. As in this example, the image plane distance Lf is taken to be positive in the case where the image 350 that is imaged is more distal than the semi-transmissive reflective unit 190 as viewed by the human viewer 300. In the case of the display apparatus 19a as well, the center of the image 350 is positioned at the center of the semi-transmissive reflective unit 190 in the state 320C in which the viewpoint 306 is at the center position 314C of the eye range 114.

In the state 320L in which the viewpoint 306 is at the left edge position 314L of the eye range 114 as viewed by the human viewer 300, the image 350 moves toward the left side inside the semi-transmissive reflective unit 190. Conversely, in the state 320R in which the viewpoint 306 is at the right edge position 314R of the eye range 114 as viewed by the human viewer 300, the image 350 moves in the right direction inside the semi-transmissive reflective unit 190.

Thus, in the display apparatus 19a, the position of the image 350 moves according to the movement of the viewpoint 306. In the case where the size of the semi-transmissive reflective unit 190 of the display apparatus 19a is the same as that of the display apparatus 10, the image 350 juts outside the semi-transmissive reflective unit 190 due to the movement of the image 350 according to the movement of the viewpoint 306. In other words, a portion of the image 350 is not displayed (is cut off). Therefore, the size of the semi-transmissive reflective unit 190 is greater than in the case of the display apparatus 10 to show the image 350 without the image 350 being cut off even when the viewpoint 306 moves inside the eye range 114. In other words, the size of the semi-transmissive reflective unit 190 is greater than the size of the image 350.

Figure 5:
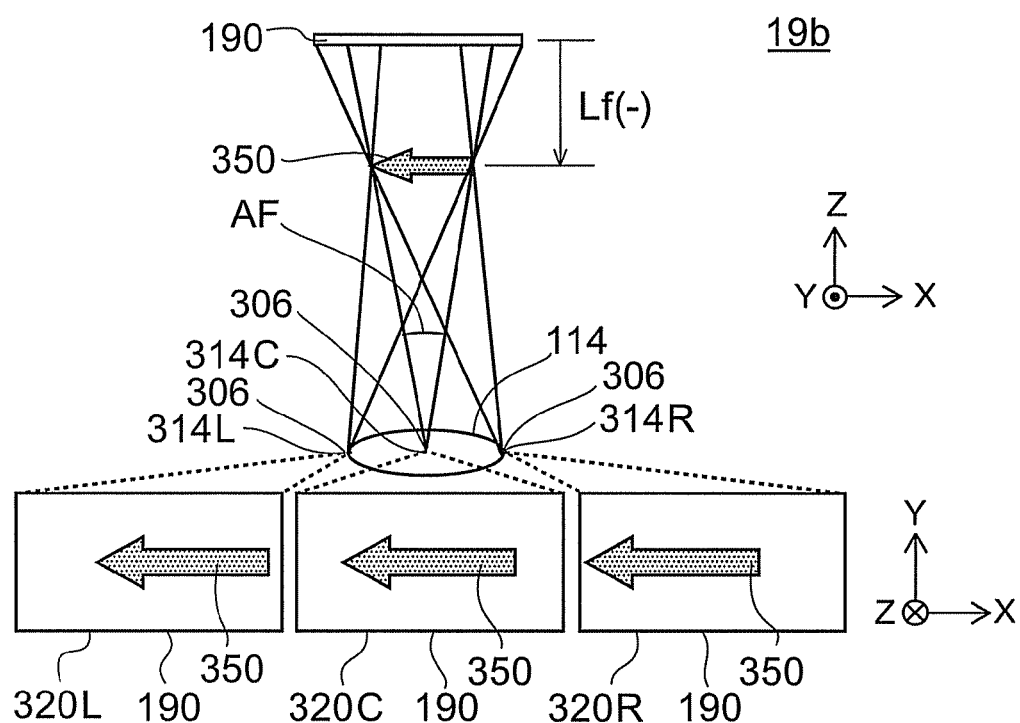
FIG. 5 is a schematic view illustrating characteristics of a display apparatus of another reference example.

FIG. 5 is a schematic view illustrating characteristics of a display apparatus of another reference example.

In the display apparatus 19b, the image 350 that is imaged is more proximal than the semi-transmissive reflective unit 190 as viewed by the human viewer 300. In this example, the image plane distance Lf is negative. In the case of the display apparatus 19b as well, the center of the image 350 is positioned at the center of the semi-transmissive reflective unit 190 in the state 320C in which the viewpoint 306 is at the center position 314C of the eye range 114.

In the state 320L in which the viewpoint 306 is at the left edge position 314L of the eye range 114 as viewed by the human viewer 300, the image 350 moves toward the right side inside the semi-transmissive reflective unit 190. Conversely, in the state 320R in which the viewpoint 306 is at the right edge position 314R of the eye range 114 as viewed by the human viewer 300, the image 350 moves in the left direction inside the semi-transmissive reflective unit 190.

Thus, in the display apparatus 19b as well, the position of the image 350 moves according to the movement of the viewpoint 306. Therefore, the size of the semi-transmissive reflective unit 190 becomes greater than the size of the image 350 to show the image 350 without the image 350 being cut off.

Thus, when the viewpoint 306 moves inside the prescribed eye range 114, the size of the semi-transmissive reflective unit 190 necessary to show the image 350 without the image 350 being cut off is small in the case where the image 350 is imaged at the semi-transmissive reflective unit 190 (in the case where the image plane distance Lf is 0), and is large otherwise.

Figure 6A:
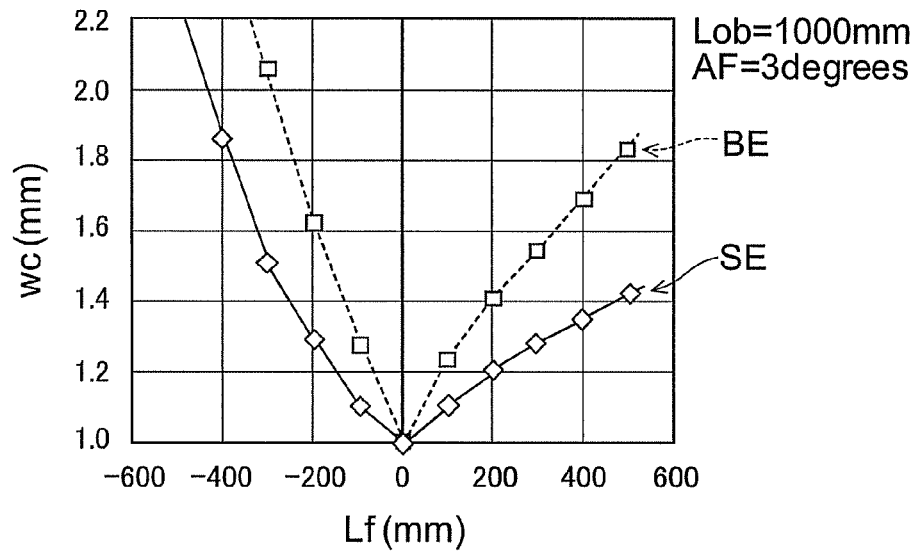
FIG. 6A and FIG. 6B are graphs illustrating the width of the semi-transmissive reflective unit of the display apparatus.
Figure 6B:
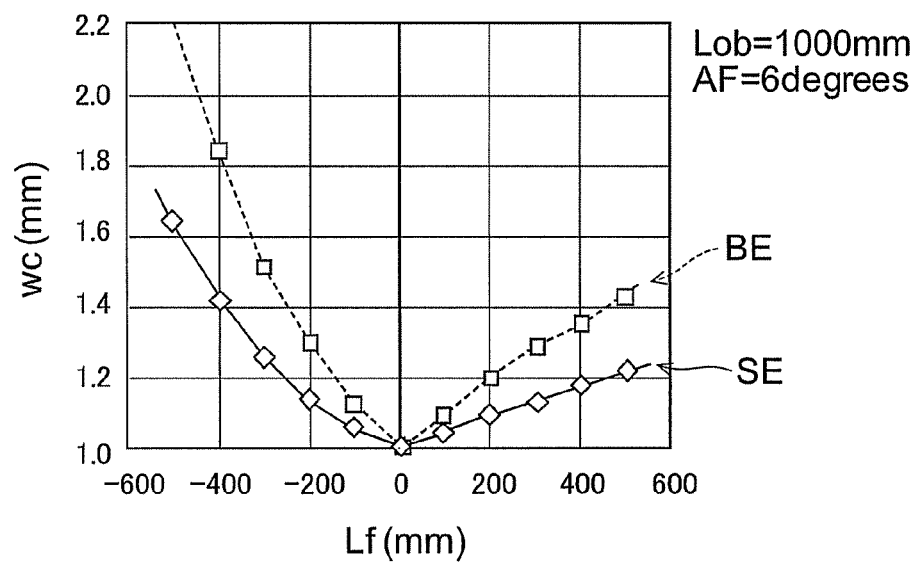

FIG. 6A and FIG. 6B are graphs illustrating the width of the semi-transmissive reflective unit of the display apparatus.

These drawings illustrate the minimum width wc (the width in the lateral direction) of the semi-transmissive reflective unit 190 to show the image without the image being cut off even when the viewpoint 306 moves between the left edge and the right edge of the eye range 114 when the image plane distance Lf (the distance between the semi-transmissive reflective unit 190 and the imaging position of the image 350) is changed. In this example, the distance Lob between the viewpoint 306 (the eye 302) and the semi-transmissive reflective unit 190 is 1000 mm.

FIG. 6A corresponds to the case where the angle of view AF is 3 degrees; and FIG. 6B corresponds to the case where the angle of view AF is 6 degrees. In these drawings, the horizontal axis is the image plane distance Lf. When viewed by the human viewer 300, the image plane distance Lf being positive corresponds to the image 350 being disposed more distally than is the semi-transmissive reflective unit 190; and the image plane distance Lf being negative corresponds to the image 350 being disposed more proximally than is the semi-transmissive reflective unit 190. In these drawings, the vertical axis illustrates the minimum width wc of the semi-transmissive reflective unit 190. In FIG. 6A and FIG. 6B, the minimum width wc is normalized to have a value of 1 when the image plane distance Lf is 0. These drawings illustrate the characteristics in the case of viewing with the one eye 302 (monocular vision SE) and in the case of viewing with both eyes (binocular vision BE). The width wa of the eye range 114 in the lateral direction in the case of the monocular vision SE is taken to be 65 mm; and the width wa of the eye range 114 in the lateral direction in the case of the binocular vision BE is taken to be 130 mm.

For the monocular vision SE and the binocular vision BE as illustrated in FIG. 6A and FIG. 6B, the minimum width wc of the semi-transmissive reflective unit 190 is smallest when the image plane distance Lf is 0 (when the image 350 is imaged at the position of the semi-transmissive reflective unit 190). The minimum width wc increases as the absolute value of the image plane distance Lf increases. The increase rate of the minimum width wc when the image plane distance Lf is negative is greater than the increase rate when the image plane distance Lf is positive.

When the image plane distance Lf is positive or negative, the minimum width wc of the semi-transmissive reflective unit 190 is smaller for the monocular vision SE than for the binocular vision BE. For example, when the image plane distance Lf is positive, the minimum width wc of the semi-transmissive reflective unit 190 for the monocular vision SE is about ½ of the minimum width wc of the semi-transmissive reflective unit 190 for the binocular vision BE. The difference of the surface areas is the square of such a difference of widths.

In the cases of both the monocular vision SE and the binocular vision BE, the minimum width wc of the semi-transmissive reflective unit 190 can be smallest when the image plane distance Lf is 0. However, in the case of the binocular vision BE, it is necessary for the position of the image plane to be separated from the human viewer 300 by not less than 1500 mm (for the image plane distance Lf to be not less than 500 mm) to somewhat suppress the difficulty of viewing due to the binocular parallax when the background image 750 and the image 350 are viewed superimposed. Therefore, the region of FIG. 6A and FIG. 6B where the image plane distance Lf is less than 500 mm cannot be used for the binocular vision BE.

On the other hand, for the monocular vision SE, the image plane distance Lf can have any value because the difficulty of viewing due to the binocular parallax does not occur. In other words, the image plane distance Lf may be less than 500 mm.

As illustrated in FIG. 6A and FIG. 6B, the minimum width wc of the semi-transmissive reflective unit 190 can be reduced as the absolute value of the image plane distance Lf is reduced (approaches 0). From the viewpoint of the size of the semi-transmissive reflective unit 190, it is most favorable for the image 350 (the light flux 112) to be imaged at the position of the semi-transmissive reflective unit 190 (the image plane distance Lf being 0). However, the embodiment is not limited thereto. The size of the semi-transmissive reflective unit 190 can be reduced by causing the image 350 (the light flux 112) to be imaged at a position proximal to the semi-transmissive reflective unit 190.

By disposing the imaging plane of the light flux 112 at (e.g., proximal to) the position of the semi-transmissive reflective unit 190 in the embodiment as described in regard to FIG. 3, the position of the image 350 substantially does not move inside the semi-transmissive reflective unit 190 even in the case where the viewpoint 306 moves. Therefore, even in the case where the viewpoint 306 moves upward, downward, leftward, and rightward due to shaking of the vehicle 730, etc., the position of the image 350 is fixed to the prescribed position of the semi-transmissive reflective unit 190. For example, in the case where the designated image 350 (e.g., an arrow) is superimposed onto a designated location (e.g., an intersection) of the background image 750, the relative relationship between the position of the image 350 and the position of the background image 750 is substantially fixed. Therefore, even in the case where the position of the viewpoint 306 moves in the embodiment, the superimposition of the image 350 onto the position of the desired background image 750 can be maintained. As viewed by the human viewer 300, the image 350 is easy to view; and a safer operation of the vehicle 730 can be supported.

For example, there is a display apparatus (a HUD) of the monocular vision SE having a configuration in which an aperture stop that limits the eye range 114 of the light flux 112 is provided; and there is an imaging relationship between the position of the aperture stop and the position of the human viewer 300. As viewed by the human viewer 300 in this example, the light flux 112 (the image 350) is imaged on the distal side of the semi-transmissive reflective unit 190 and is not less than 1500 mm from the semi-transmissive reflective unit 190. In this HUD, a distal imaging configuration is employed in which the imaging is at a position distal to the semi-transmissive reflective unit 190. In this HUD, in the case where the image information such as the arrow, etc., is displayed superimposed onto the background such as the road surface, etc., an approach is employed in which the image 350 is imaged at a position proximal to the road surface (the background).

However, in the distal imaging configuration as recited above, the size of the semi-transmissive reflective unit 190 increases. Further, the position of the image 350 shifts easily from the background image 750 when the viewpoint 306 moves due to the shaking of the vehicle 730, etc.

Conversely, the embodiment is based on a new approach in which the light flux 112 (the image 350) is imaged not at a position proximal to the road surface (i.e., a position distal to the semi-transmissive reflective unit 190) but at a position proximal to the semi-transmissive reflective unit 190. In the display apparatus 10 according to the embodiment, a proximal imaging configuration is employed in which the imaging is proximal to the semi-transmissive reflective unit 190. Thereby, the semi-transmissive reflective unit 190 can be small; the apparatus can be downsized; the position of the image 350 can be fixed even when the viewpoint 306 moves due to the shaking, etc.; and a display that is easy to view can be provided. Further, as described below, the simultaneous visibility of the image 350 and the background image 750 is better.

The results of an evaluation experiment of the visibility of the display apparatus 10 according to the embodiment will now be described. An evaluation of a display apparatus of binocular vision was performed as a reference example in the evaluation experiment.

Figure 7:
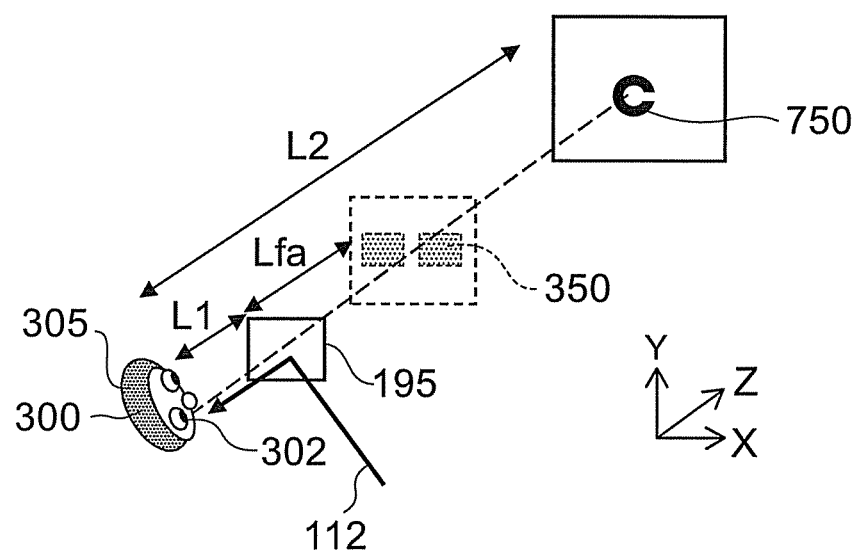
FIG. 7 is a schematic view illustrating the configuration of the evaluation experiment of the visibility of the display apparatuses.

FIG. 7 is a schematic view illustrating the configuration of the evaluation experiment of the visibility of the display apparatuses.

As illustrated in FIG. 7, images of Landolt rings projected on a screen were used as the background image 750. A distance L2 between the screen and the human viewer 300 was 5000 mm. A half mirror 195 was disposed in front of the human viewer 300; and the light flux 112 was projected toward the head 305 of the human viewer 300 by being reflected by the half mirror 195. At the half mirror 195, the light flux 112 was incident with an incident angle of 45 degrees and was emitted with an emergence angle of 45 degrees. A distance L1 between the human viewer 300 and the half mirror 195 was 500 mm. The human viewer 300 viewed the image 350 included in the light flux 112 that was reflected by the half mirror. The human viewer 300 viewed the image 350 and the background image 750 (the Landolt rings) via the half mirror 195.

In this experiment, an image plane distance Lfa (the distance between the half mirror 195 and the imaging plane) was changed by changing the imaging position of the light flux 112 (the image 350). Specifically, the evaluation was performed for the case where the image plane distance Lfa was 500 mm and for the case where the image plane distance Lfa was 2000 mm. In this experiment, it was assumed that the semi-transmissive reflective unit 190 was mounted at a position 1000 mm from the human viewer 300. The case where the image plane distance Lfa was 500 mm corresponds to the configuration (the proximal imaging configuration, i.e., the short focal distance imaging) in which the light flux 112 is imaged at the position of the semi-transmissive reflective unit 190. The case where the image plane distance Lfa was 2000 mm corresponds to the configuration (the distal imaging configuration, i.e., the long focal distance imaging) in which the imaging is at a position that is 1500 mm away from the semi-transmissive reflective unit 190. The evaluation was performed for the condition of the monocular vision SE in which the light flux 112 was projected toward only the one eye of the human viewer 300 and the condition of the binocular vision BE in which the light flux 112 was projected toward both eyes.

In the evaluation of the visibility, the image 350 was presented for a short period of time while the human viewer 300 was caused to view various Landolt rings having different cut positions in the circular rings as the background image 750; and the human viewer 300 responded regarding the content of the image 350. Specifically, two types of images 350 were used; and one selected from an image of one rectangle and an image of two rectangles was presented to the human viewer 300 for 100 milliseconds. Then, it was responded whether the number of the rectangles that was presented was one or two. In other words, in this evaluation, the simultaneous visibility of the background image 750 and the image 350 was evaluated. As viewed by the human viewer 300, the depression angle of the positions of the background image 750 (the Landolt ring) and the image 350 was 5 degrees.

In the evaluation, a number A2 of correct responses of the number of rectangles of the image 350 with respect to a number A1 of correct responses of the cut position of the Landolt ring for one participant was taken as a simultaneous visibility correct response rate Ar (=A2/A1).

The evaluation results will now be described.

For the binocular vision BE, the simultaneous visibility correct response rate Ar was 30% for a first condition in which the image plane distance Lfa was 500 mm. This is because the position of the image 350 (1000 mm from the human viewer 300) was greatly different from the position of the background image 750 (5000 mm from the human viewer 300) for the binocular vision BE. For example, from the state of being fixated on the Landolt ring, the convergence is changed by changing the fixation point to the rectangular image 350. However, there was not enough time for the change of the fixation point (the change of the convergence) because the display time of the image 350 was short, i.e., 100 ms; and the content of the image 350 could not be recognized accurately.

For the binocular vision BE, the simultaneous visibility correct response rate Ar was 82% for a second condition in which the image plane distance Lfa was 2000 mm. It is considered that in the case of binocular parallax, the difference between the fixation point distances was reduced and the simultaneous visibility correct response rate Ar was better than that of the first condition due to the position of the image 350 being more distal to the human viewer 300.

For the monocular vision SE, the simultaneous visibility correct response rate Ar was 96% for a third condition in which the image plane distance Lfa was 500 mm. Although the simultaneous visibility correct response rate Ar was 30% for the first condition of the binocular vision BE in which the image plane distance Lfa was 500 mm, the simultaneous visibility correct response rate Ar was markedly improved for the third condition of the monocular vision SE in which the image plane distance Lfa was 500 mm.

For the monocular vision SE, the simultaneous visibility correct response rate Ar was 100% for a fourth condition in which the image plane distance Lfa was 2000 mm.

For the monocular vision SE as well, it is considered that the focal point of the eye 302 is changed to accurately recognize the image 350. It is considered that a constant amount of time, albeit not as much time as for the change of the convergence, is necessary to change the focal point of the eye of the monocular vision SE. This is considered to be the reason that the simultaneous visibility correct response rate Ar was higher when the image plane distance Lfa was 2000 mm (the fourth condition) than for when the image plane distance Lfa was 500 mm (the third condition) for the monocular vision SE. However, compared to the binocular vision BE, the simultaneous visibility correct response rate Ar for the third condition is substantially as high as that of the fourth condition.

For the monocular vision SE of the display apparatus 10 according to the embodiment, the size of the semi-transmissive reflective unit 190 can be reduced while maintaining a high simultaneous visibility that is substantially similar to that of the fourth condition in which the image plane distance Lf was large (the imaging at the position separated from the semi-transmissive reflective unit 190 by 1500 mm) by the image plane distance Lf being 500 mm (the third condition) (the imaging at the position of the semi-transmissive reflective unit 190).

A high simultaneous visibility of the image 350 and the background image 750 is important in a display apparatus that presents the image information superimposed onto the background. By the simultaneous visibility being high, the recognition rate of the image information that is displayed can be increased while sufficiently recognizing the conditions of the background (the road conditions, etc.). Also, the conditions of the background (the road conditions, etc.) can be recognized instantaneously while recognizing the image information that is displayed.

An example of the distance (the image plane distance Lf) between the semi-transmissive reflective unit 190 and the imaging position of the light flux 112 (the image 350) of the display apparatus 10 according to the embodiment will now be described. An example will now be described in which a concave mirror is used as the semi-transmissive reflective unit 190.

Figure 8A:
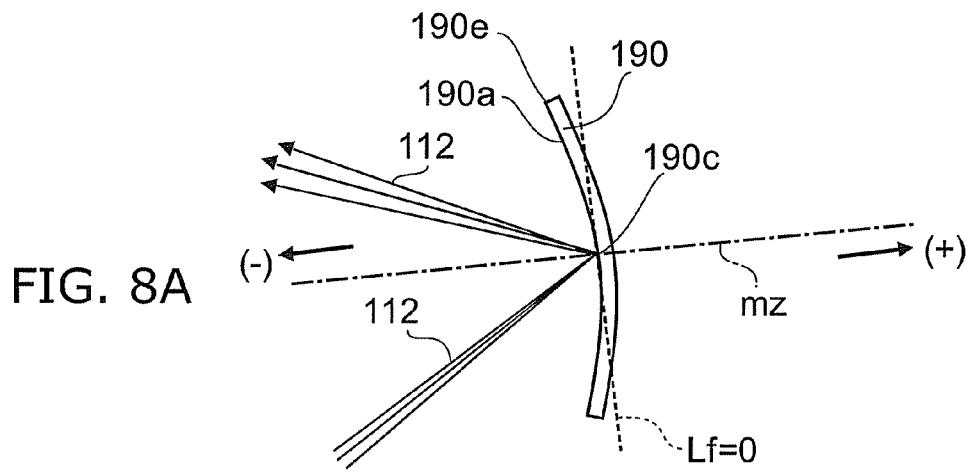
FIG. 8A to FIG. 8C are schematic views illustrating the configuration of the display apparatus according to the first embodiment.
Figure 8B:
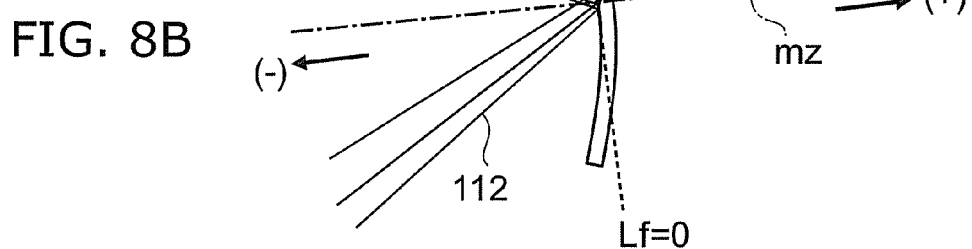
Figure 8C:
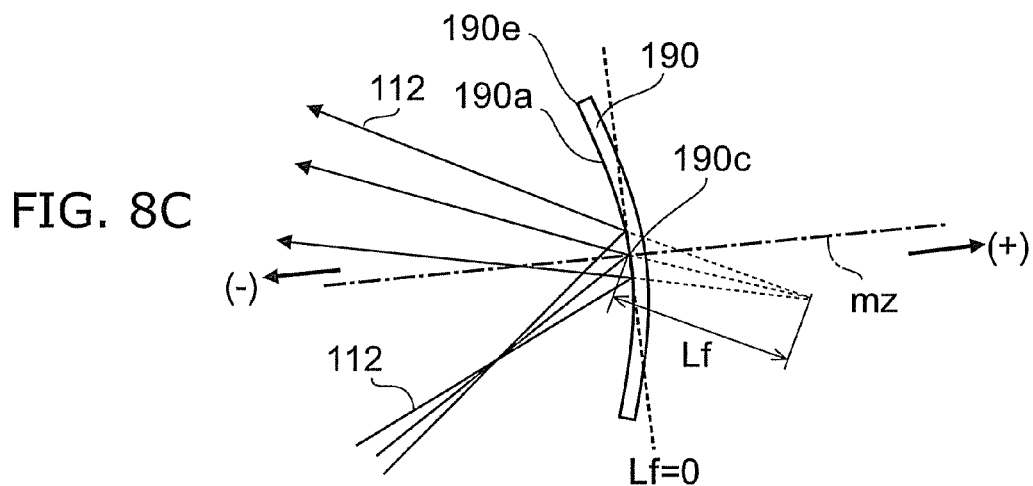

FIG. 8A to FIG. 8C are schematic views illustrating the configuration of the display apparatus according to the first embodiment.

As illustrated in FIG. 8A, the semi-transmissive reflective unit 190 has a reflective surface (a first reflective surface 190a) having a concave configuration. The first reflective surface 190a has an optical axis mz. The intersection between the optical axis mz and the first reflective surface 190a is a reflective surface center 190c. The image plane distance Lf is a distance along the light flux 112 using the position of the reflective surface center 190c as a reference. The direction from the inside toward the outside of the concave configuration of the first reflective surface 190a is taken as the positive direction. The direction from the outside toward the inside of the first reflective surface 190a is taken as the negative direction. In other words, the side where the light flux 112 is incident on the semi-transmissive reflective unit 190 and is reflected is the negative direction.

In the example illustrated in FIG. 8A, the light flux 112 is imaged at the position of the reflective surface center 190c. Accordingly, in this example, the image plane distance Lf is 0.

In the example illustrated in FIG. 8B, the light flux 112 is imaged at a position separated from the reflective surface center 190c in the negative direction after being reflected by the first reflective surface 190a. The distance along the light flux 112 (the light flux that is emitted) between the reflective surface center 190c and the imaging position is the image plane distance Lf (negative).

In the example illustrated in FIG. 8C, the light flux 112 is imaged before being incident on the first reflective surface 190a. In such a case, a virtual image is formed at a positive position of the semi-transmissive reflective unit 190. The distance along the light flux 112 (the light flux that is emitted) between the reflective surface center 190c and the position of the virtual image is the image plane distance Lf (positive).

Thus, in the embodiment, not only may the light flux 112 be imaged strictly at the position of the semi-transmissive reflective unit 190, but the light flux 112 also may be imaged proximally to the semi-transmissive reflective unit 190. The absolute value of the image plane distance Lf is not more than ½ of the distance Lob between the human viewer 300 and the semi-transmissive reflective unit 190.

For example, the absolute value of the image plane distance Lf is not more than 250 mm.

In the display apparatus 10, for example, the semi-transmissive reflective unit 190 is disposed proximally to the windshield unit 731 of the vehicle 730. There are many cases where the dashboard 720 is on the lower side of the windshield unit 731; and instrument display apparatuses that display vehicle information of the vehicle 730 (including the vehicle speed, etc.) are provided in the dashboard 720. In such a case, it is desirable from the viewpoint of ease of viewing and fatigue for the imaging position of the image 350 to be proximal to the position of the instrument display apparatuses in the depth direction as viewed by the human viewer 300.

Therefore, it is practically favorable for the distance from the semi-transmissive reflective unit 190 to the imaging position of the image 350 to be not more than 250 mm, which is assumed to be the distance along the depth direction (the Z axis) from the semi-transmissive reflective unit 190 to the instrument display apparatus.

For example, in the distal imaging configuration in which the image 350 is imaged at the distal position that is 1500 mm from the semi-transmissive reflective unit 190, etc., the images at three types of distances are viewed for the instrument display apparatus, the image 350, and the background image 750. Conversely, in the proximal imaging configuration in which the image 350 is imaged at the proximal position that is 250 mm from the semi-transmissive reflective unit 190, etc., there are two types of distances of the images for the background image 750 and for the instrument display apparatuses and the position of the image 350. Because there are substantially two types of distances of the images in the embodiment, the burden on the body of the human viewer 300 is light; and the fatigue is reduced.

Considering being more proximal to the position of the instrument display apparatuses, it is favorable for the imaging position to be in front (the negative direction) of the semi-transmissive reflective unit 190 as viewed by the human viewer 300. It is favorable for the image plane distance Lf to be about 250 mm.

On the other hand, as described in regard to FIG. 3, FIG. 6A, and FIG. 6B, it is good for the image plane distance Lf to be small from the viewpoint of the minimum width wc of the semi-transmissive reflective unit 190 and the viewpoint of the movement of the image 350 according to the movement of the viewpoint 306.

Overall, from the description recited above, it is favorable for the image plane distance Lf (the absolute value of the image plane distance Lf) to be not more than 250 mm.

For example, the display apparatus 10 according to the embodiment may be used not only in a HUD for a vehicle but in any display apparatus such as various windows, merchandise display cases, etc., in which the background image 750 that passes through the semi-transmissive reflective unit 190 is viewed simultaneously with the image 350 that is formed of the light flux 112 that is reflected and projected by the semi-transmissive reflective unit 190. Thereby, a display that is easy to view is possible without the difficulty of viewing due to the binocular parallax. Also, a display having better depth perception is possible. Further, for example, as an application other than a HUD, the display apparatus according to the embodiment may be used in a display that presents an image to only designated people or to only the eyes of designated people among multiple people.

Figure 9:
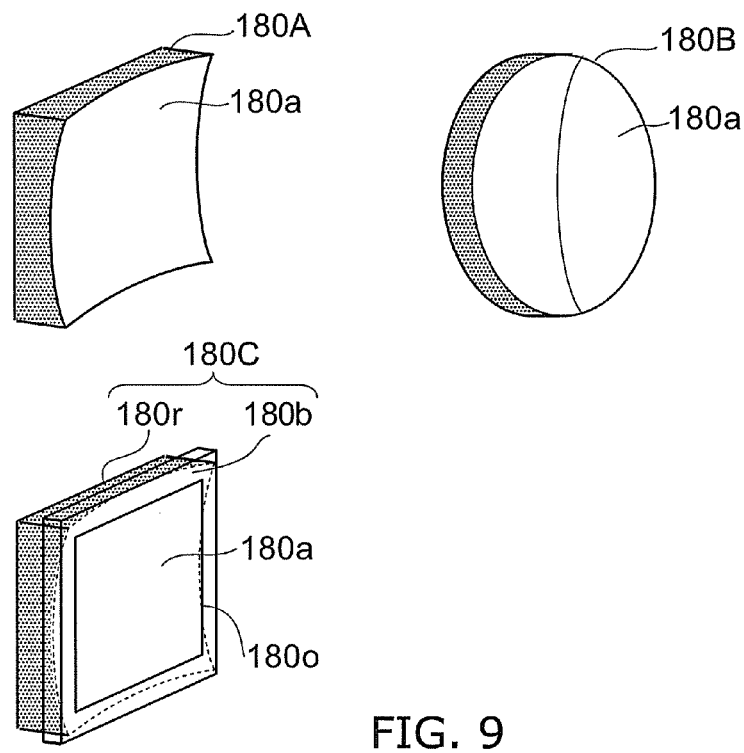
FIG. 9 is a schematic view illustrating a portion of the display apparatus according to the first embodiment.

FIG. 9 is a schematic view illustrating a portion of the display apparatus according to the first embodiment.

FIG. 9 illustrates an example, of the projection region limiting unit. The projection region limiting unit according to the embodiment may include a concave mirror. In other words, projection region limiting units 180A and 180B have a second reflective surface 180a having a concave configuration. The exterior form of the projection region limiting unit 180A is a quadrilateral (e.g., a rectangle) when viewed along the optical axis of the projection region limiting unit 180A. The corners of the quadrilateral may have curved configurations. The exterior form of the projection region limiting unit 180B is a circle (including a flattened circle). The eye range 114 is limited by limiting the position of the outer edge of the second reflective surface 180a (i.e., by limiting the exterior form of the second reflective surface 180a).

A projection region limiting unit 180C has a limiting unit 180b and a concave mirror (a reflecting unit 180r) that has the second reflective surface 180a having a concave configuration. The reflecting unit 180r has the second reflective surface 180a having the concave configuration. The limiting unit 180b is provided at the rim of the reflecting unit 180r and absorbs the light that is incident on the rim. The limiting unit 180b limits the region where the light is incident on the second reflective surface 180a of the reflecting unit 180r. The limiting unit 180b shields at least a portion of the outer edge portion (the rim) of the second reflective surface 180a. The limiting unit 180b is light-absorbing. The limiting unit 180b has an opening 180o; and the second reflective surface 180a is exposed at the opening 180o. The portion of the second reflective surface 180a that is not covered with the limiting unit 180b reflects the light flux 112 toward the semi-transmissive reflective unit 190. The portion of the second reflective surface 180a that is shielded by the limiting unit 180b does not function to reflect the light flux 112 toward the semi-transmissive reflective unit 190. The eye range 114 is limited by limiting the opening 180o of the limiting unit 180b. For example, a holder that holds and fixes the reflecting unit 180r may be used as the limiting unit 180b. By using a holder that functions as the limiting unit 180b, the number of parts can be reduced.

The configuration of the region of the second reflective surface 180a not covered with the region limiting unit 180b (e.g., the configuration of the opening 180o) is a quadrilateral (e.g., a rectangle, etc.). The corners of the quadrilateral may have curved configurations. Also, a circle (including a flattened circle) may be used. The configuration of the reflecting unit 180r, the configuration of the region limiting unit 180b, and the configuration of the opening 180o are arbitrary.

By the image plane distance Lf (the absolute value of the image plane distance Lf) being not more than 250 mm in the display apparatus 10 according to the first embodiment, the simultaneous visibility rate of the image 350 and the background image 750 can be high; and the image 350 that is easy to view can be provided. Because the position of the image 350 substantially does not move even when the viewpoint 306 moves due to the shaking, etc., for example, the state in which the image 350 is superimposed onto the background image 750 can be maintained; and the information that is indicated by the image 350 can be conveyed in a manner that is easier to perceive. Further, the semi-transmissive reflective unit 190 can be small; and the apparatus can be downsized.

Second Embodiment

Figure 10:
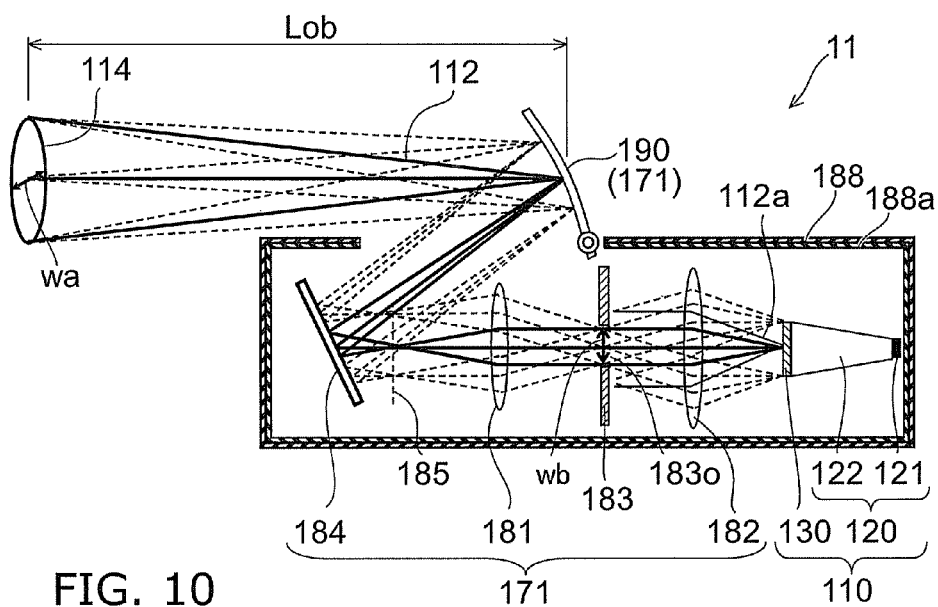
FIG. 10 is a schematic view illustrating the configuration of a display apparatus according to a second embodiment.

FIG. 10 is a schematic view illustrating the configuration of a display apparatus according to a second embodiment.

As illustrated in FIG. 10, the display apparatus 11 according to the embodiment includes the image formation unit 110 and a projection unit 171. The housing 188 also is provided. The projection unit 171 includes an aperture stop 183, a first light-concentrating element 181 (e.g., a first lens), a second light-concentrating element 182 (e.g., a second lens), a reflective mirror 184, and the semi-transmissive reflective unit 190. In the embodiment, the aperture stop 183 is used as the projection region limiting unit. The aperture stop 183 has an opening 183o. A plane mirror or a concave mirror may be used as the reflective mirror 184. The configurations described in regard to the first embodiment may be employed for the image formation unit 110, the housing 180, and the semi-transmissive reflective unit 190; and a description is therefore omitted. The aperture stop 183, the first light-concentrating element 181, the second light-concentrating element 182, and the reflective mirror 184 will now be described.

On the optical path of the light flux, the first light-concentrating element 181 is provided between the image formation unit 110 and the reflective mirror 184; the aperture stop 183 is provided between the image formation unit 110 and the first light-concentrating element 181; and the second light-concentrating element 182 is provided between the image formation unit 110 and the aperture stop 183. The first light-concentrating element 181 has a first focal distance $f_1$; and the second light-concentrating element 182 has a second focal distance $f_2$.

For example, the distance between the aperture stop 183 and the first light-concentrating element 181 is set to be the first focal distance $f_1$. The distance between the aperture stop 183 and the second light-concentrating element 182 is set to be the second focal distance $f_2$.

In this example, an intermediate image 185 is formed at a position between the reflective mirror 184 and the first light-concentrating element 181. The distance between the first light-concentrating element 181 and the position where the intermediate image 185 is formed is the first focal distance $f_1$.

The aperture stop 183 is light-absorbing. A portion of the light flux 112a emitted from the image formation unit 110 is absorbed by the aperture stop 183; and this light is not used. The light of the light flux 112a that passes through the opening 183o of the aperture stop 183 reaches the semi-transmissive reflective unit 190 via the reflective mirror 184. The light (the light flux 112) that is reflected by the semi-transmissive reflective unit 190 is projected toward the human viewer 300. The width wa of the eye range 114 of the light flux 112 at the position of the human viewer 300 is proportional to a width wb of the opening 183o.

In the display apparatus 11 as well, the light flux 112 is imaged proximally to the semi-transmissive reflective unit 190. In other words, the distance between the imaging plane and the semi-transmissive reflective unit 190 is not more than 250 mm. Thereby, a display that is easy to view is possible. Also, the apparatus can be downsized.

Third Embodiment

Figure 11:
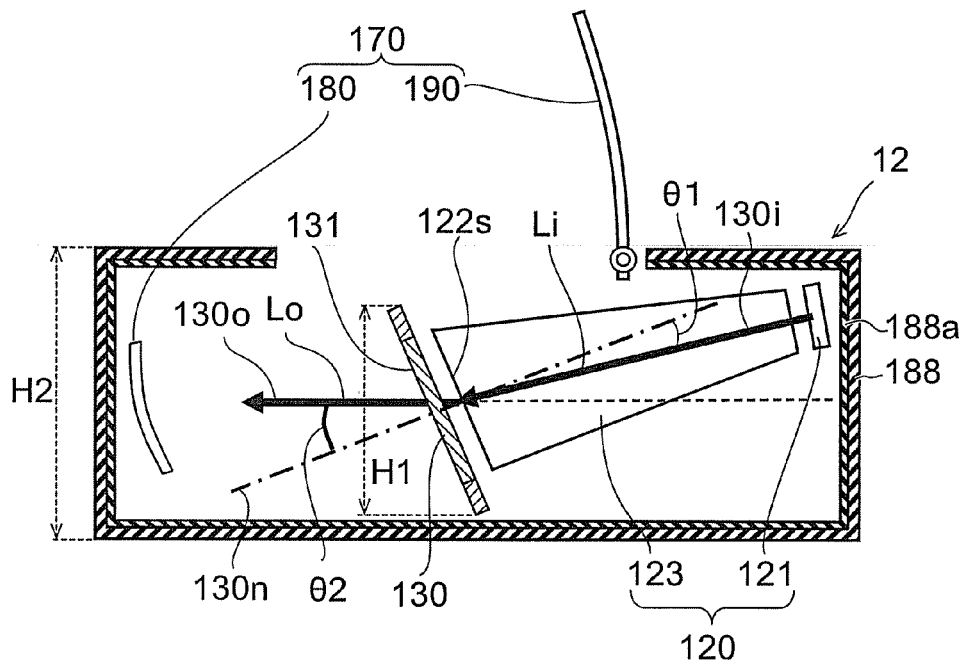
FIG. 11 is a schematic view illustrating the configuration of a display apparatus according to a third embodiment.

FIG. 11 is a schematic view illustrating the configuration of a display apparatus according to a third embodiment.

As illustrated in FIG. 11, the display apparatus 12 according to the embodiment includes the image formation unit 110, the projection unit 170, and the housing 180. The image formation unit 110 includes the light source 120 and the light flux modulator 130. The light source 120 includes the light producing device 121 and a tapered light guide 123. The configurations described in regard to the first embodiment are applicable to the projection unit 170 and the housing 180, and a description is therefore omitted. The portions of the light source 120 and the light flux modulator 130 that differ from those of the first embodiment will now be described.

In the display apparatus 12, the surface (an emission surface 122s) of the tapered light guide 123 that opposes the light flux modulator 130 is tilted with respect to the optical axis of the tapered light guide 123. The normal of the emission surface 122s of the tapered light guide 123 is tilted at a prescribed angle (an incident angle $\theta 1$) with respect to an optical axis 130i of light Li emitted from the light producing device 121. An optical axis 130o of the light (the emitted light Lo) emitted from the light flux modulator 130 is tilted with respect to the normal 130n of a major surface 131 of the light flux modulator 130. For example, the angle (an emergence angle $\theta 2$) between the optical axis 130o and the normal 130n of the major surface 131 of the light flux modulator 130 is not less than 3 degrees and not more than 20 degrees.

Here, from Snell's law, $n1 \cdot \sin\theta 1 = n2 \cdot \sin\theta 2$, where the refractive index of the tapered light guide 123 is n1 and the refractive index of the outside (the air) is n2. When n2=1 and n1 is about 1.5, $\sin\theta 1 = (\sin\theta 2)/1.5$. The incident angle $\theta 1$ is set to be not less than 2 degrees and not more than 13 degrees to correspond to the emergence angle $\theta 2$ that is not less than 3 degrees and not more than 20 degrees.

For example, in the case where the optical axis 130o of the emitted light Lo from the light flux modulator 130 is parallel to the normal 130n of the light flux modulator 130, external light such as that from the sun, etc., is reflected inside the display apparatus when the external light is incident on the projection region limiting unit 180; and the light that is reflected is incident on the eye 302 of the human viewer 300 by being emitted along the optical axis 130o. In the case where the external light is incident on the eye 302 by such a path, the human viewer 300 may be blinded by the external light. Also, there are cases where it is difficult to recognize the image 350 that is displayed.

In the display apparatus 12, the external light that would be incident on the eye 302 of the human viewer 300 by the path recited above can be suppressed because the optical axis 130o of the emitted light Lo from the light flux modulator 130 is tilted with respect to the normal 130n of the light flux modulator 130. In other words, in the case where the external light that is incident on the projection region limiting unit 180 is incident on the light flux modulator 130 along the optical axis 130o and is emitted by being reflected by the light flux modulator 130, such light is emitted toward a direction that is different from the direction of the optical axis 130o (the direction toward the projection region limiting unit 180). For example, such light is absorbed by the light absorption layer 188a that is provided on the inside of the housing 188. Thereby, the reflected light is not incident on the eye 302.

In the case where the emergence angle $\theta 2$ is too small, there are cases where the reflected light that passes through a portion of the projection region limiting unit 180 reaches the eye 302. Therefore, for example, the emergence angle $\theta 2$ is set to be not less than 3 degrees.

In the case where the emergence angle $\theta 2$ is too large, the degradation of the optical characteristics (e.g., the transmittance) of the light flux modulator 130 becomes pronounced. The degradation of the optical characteristics is practically not problematic in the case where the emergence angle $\theta 2$ is not more than 20 degrees.

By the optical axis 130*o* of the light (the emitted light Lo) emitted from the light flux modulator 130 being tilted with respect to the normal 130*n* of the major surface 131 of the light flux modulator 130, a height H1 of the light flux modulator 130 along a direction perpendicular to the optical axis 130*o* can be reduced. Thereby, for example, a height H2 of the housing 188 can be reduced to contribute to downsizing the display apparatus 12.

Fourth Embodiment

Figure 12:
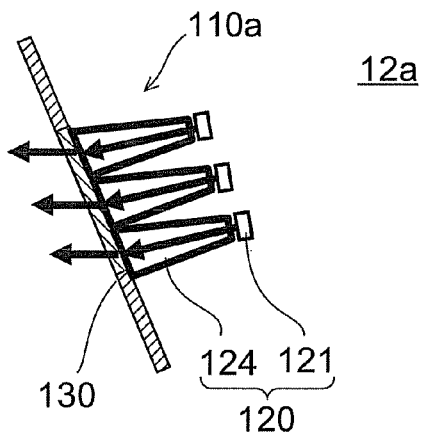
FIG. 12 is a schematic view illustrating the configuration of a display apparatus according to a fourth embodiment.

FIG. 12 is a schematic view illustrating the configuration of a display apparatus according to a fourth embodiment.

The display apparatus 12*a* according to the embodiment includes an image formation unit 110*a* and a projection unit. The configuration described in regard to the first embodiment is applicable to the projection unit; and the projection unit is therefore not illustrated in FIG. 12.

The image formation unit 110*a* includes the light flux modulator 130 and multiple light sources 120. The configuration described in regard to the first embodiment is applicable to the light flux modulator 130, and a description is therefore omitted. In this example, three light sources 120 are provided for one light flux modulator 130. Each of the multiple light sources 120 includes the light producing device 121 and a tapered light guide 124. The configuration described in regard to the first embodiment is applicable to the light producing device 121, and a description is therefore omitted. The configuration of one selected from the tapered light guide 122 described in regard to the first embodiment (the optical axis being perpendicular to the emission surface) and the tapered light guide 123 described in regard to the third embodiment (the optical axis being tilted with respect to the emission surface) is applicable to the tapered light guide 124. In this example, the optical axis of the tapered light guide 124 is tilted with respect to the emission surface.

The emission surface (the bottom surface) of each of the tapered light guides 124 is disposed to oppose the one light flux modulator 130. The optical axes of the tapered light guides 124 are substantially parallel to each other. The light emitted from the three light sources 120 is incident on the light flux modulator 130. The optical axes of the light that is emitted when the light emitted from the three light sources 120 passes through the light flux modulator 130 are substantially parallel to each other. By providing the multiple tapered light guides 124, the length along the optical axis of one tapered light guide 124 can be reduced; and the apparatus can be downsized further. The number of the light sources 120 provided for one light flux modulator 130 is arbitrary.

Fifth Embodiment

The embodiment relates to the moving body 700 (e.g., the vehicle 730). An example of the configuration of the moving body 700 is as described in regard to FIG. 2. The moving body 700 includes any display apparatus according to the first embodiment, the vehicle body 701 (the enclosing unit) in which the display apparatus is mounted, and the seat 740 including the backrest unit 742. In the moving body 700 according to the embodiment, the distance (the image plane distance Lf) between the semi-transmissive reflective unit 190 and the position of the imaging of the light flux 112 is shorter than ½ of the distance between the semi-transmissive reflective unit 190 and the position of the backrest unit 742. Because the human viewer 300 is seated in the seat 740, the distance Lob between the semi-transmissive reflective unit 190 and the eye 302 of the human viewer 300 can be considered to be substantially the same as the distance between the backrest unit 742 and the semi-transmissive reflective unit 190. In such a case as well, the light flux 112 (the image 350) is imaged proximally to the semi-transmissive reflective unit 190. In other words, the image plane distance Lf is not more than 250 mm.

Thereby, a moving body can be provided in which a display apparatus for one eye that is easy to view is mounted.

Although the case is described in the first to fourth embodiments where the semi-transmissive reflective unit 190 is provided in the projection unit 170, the semi-transmissive reflective unit 190 may be provided separately from the projection unit 170 in the moving body 700 (e.g., the vehicle 730). For example, the semi-transmissive reflective unit 190 may be provided on the surface of the windshield unit 731 on the interior side of the moving body 700. Thus, the semi-transmissive reflective unit 190 may be provided in the display apparatus for one eye and may be provided in the moving body 700.

In the case where the semi-transmissive reflective unit 190 is provided in the moving body 700, the display apparatus is mounted inside the vehicle 730 such that the imaging plane of the light flux 122 (the image 350) is disposed proximally to the semi-transmissive reflective unit 190. Specifically, the display apparatus is mounted such that the image plane distance Lf is not more than 250 mm. Thereby, a display that is easy to view can be provided; and the display apparatus can be downsized.

Figure 13:
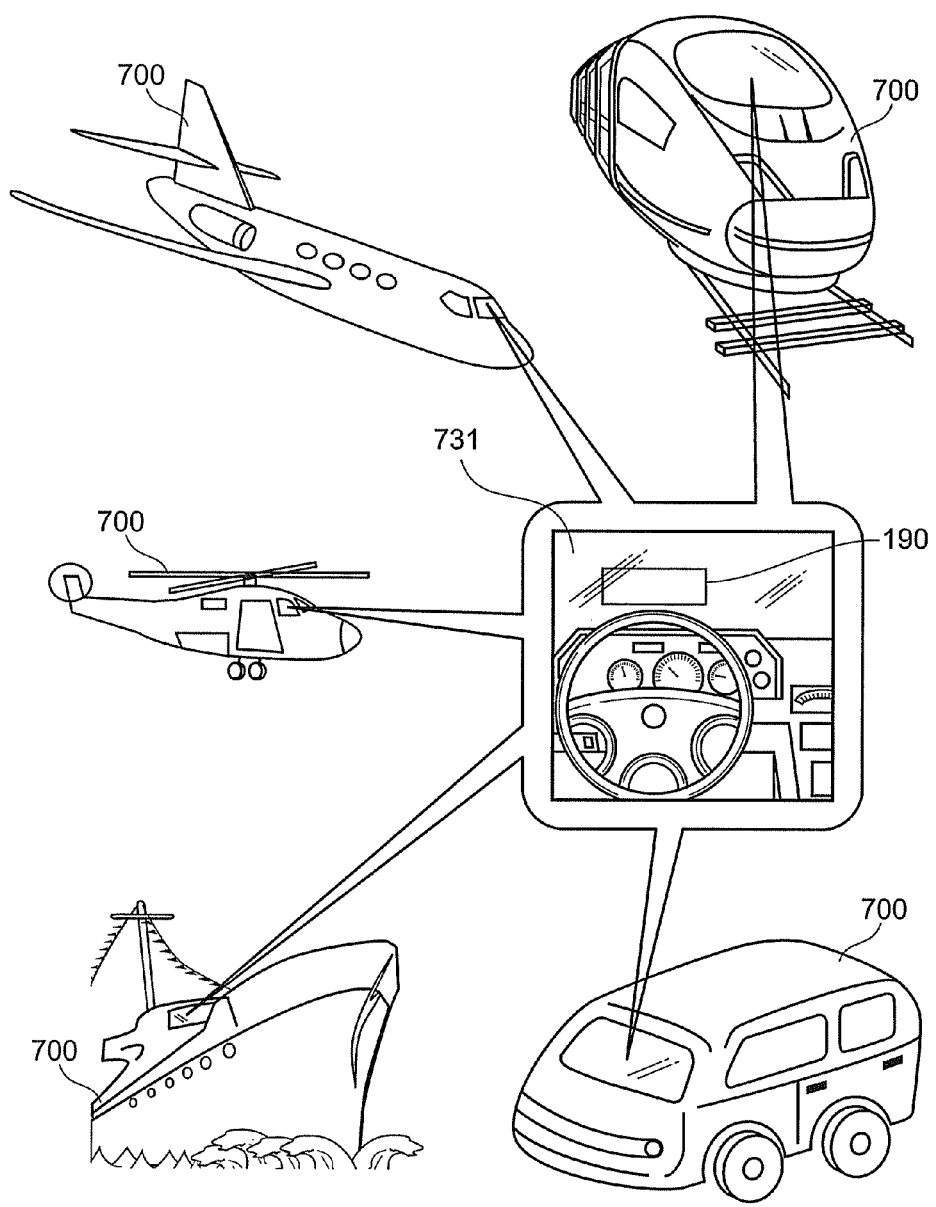
FIG. 13 is a schematic view illustrating moving bodies according to the fifth embodiment.

FIG. 13 is a schematic view illustrating moving bodies according to the fifth embodiment.

As illustrated in FIG. 13, the moving body 700 according to the embodiment may include not only the vehicle 730 such as an automobile, etc., but also various forms such as a train, an airplane, a helicopter, a ship, etc.

Sixth Embodiment

The embodiment relates to a method for mounting the display apparatus.

The display apparatus used in the method for mounting is a display apparatus for one eye. The display apparatus includes the image formation unit 110 that emits the light flux 112 including the image information, and the projection unit 170 that includes the projection region limiting unit 180 that limits the width of the light flux 112 emitted from the image formation unit 110. In this example, the semi-transmissive reflective unit 190 is mounted, for example, in the vehicle 730. In the embodiment, the display apparatus is mounted such that the distance between the imaging plane of the light flux 112 emitted from the projection region limiting unit 180 and the semi-transmissive reflective unit 190 that reflects the light flux 122 is not more than 250 mm.

Here, when mounting the display apparatus, the semi-transmissive reflective unit 190 may not actually be mounted. For example, the display apparatus may be mounted 30, such that the distance between the imaging plane of the light flux 122 and the prescribed position (the design position) where the semi-transmissive reflective unit 190 is to be mounted is not more than 250 mm.

In the method for mounting, as in the display apparatus 11 illustrated in FIG. 10, the projection unit 171 that includes the projection region limiting unit 180 (the aperture stop 183), the first light-concentrating element 181, the second light-concentrating element 182 (e.g., the second lens), and the reflective mirror 184 may be used.

According to the method for mounting the display apparatus according to the embodiment, the display apparatus can be mounted to display the information to be easy to view by the image plane distance Lf being not more than 250 mm. Also, a compact display apparatus may be used.

According to the embodiments, a display apparatus for one eye that is easy to view, a moving body, and a method for mounting the display apparatus can be provided.

Hereinabove, exemplary embodiments of the invention are described with reference to specific examples. However, the invention is not limited to these specific examples. For example, one skilled in the art may similarly practice the invention by appropriately selecting specific configurations of components included in display apparatuses such as image formation units, light sources, light producing devices, light guide portions, tapered light guides, light flux modulators, projection region limiting units, projection units, reflecting units, region limiting units, first light-concentrating elements, second light-concentrating elements, and aperture stops and specific configurations of components included in moving bodies such as enclosing units, vehicle bodies, seats, backrest units, seating units, etc., from known art; and such practice is included in the scope of the invention to the extent that similar effects are obtained.

Further, any two or more components of the specific examples may be combined within the extent of technical feasibility and are included in the scope of the invention to the extent that the purport of the invention is included.

Moreover, all display apparatuses, moving bodies, and methods for mounting the display apparatuses practicable by an appropriate design modification by one skilled in the art based on the display apparatus, the moving bodies, and methods for mounting the display apparatuses described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A display apparatus to project a light flux including image information toward one eye, the apparatus comprising:
   an image formation unit configured to emit the light flux; and
   a projection unit including;
      a projection region limiting unit to limit a width of the light flux emitted from the image formation unit, the projection region limiting unit having a reflective surface, the reflective surface having a concave configuration; and
      a semi-transmissive reflective unit to reflect the light flux emitted from the projection region limiting unit,
      a distance between the semi-transmissive reflective unit and an imaging plane of the light flux being not more than 250 mm.

2. The apparatus according to claim 1, wherein the projection region limiting unit includes a reflecting unit and a limiting unit, the reflecting unit having the reflective surface, the limiting unit being provided at a rim of the reflecting unit absorbing a light incident on the rim.

3. The apparatus according to claim 1, wherein the projection region limiting unit limits a width in a lateral direction of the light flux reflected by the semi-transmissive reflective unit and projected toward a human viewer to be not more than 70 mm at a position of a head of the human viewer when viewed by the human viewer.

4. The apparatus according to claim 1, wherein the distance between the semi-transmissive reflective unit and the imaging plane of the light flux is shorter than a distance between the imaging plane of the light flux and an eye of a human viewer, the light flux being reflected by the semi-transmissive reflective unit and being projected toward the human viewer.

5. The apparatus according to claim 1, wherein the distance between the semi-transmissive reflective unit and the imaging plane of the light flux is not more than ½ of a distance between the semi-transmissive reflective unit and an eye of a human viewer, the light flux being reflected by the semi-transmissive reflective unit and being projected toward the human viewer.

6. The apparatus according to claim 1, wherein
   the image formation unit includes a light flux modulator to produce the light flux including the image information by modulating a light, and
   the projection region limiting unit is disposed between the light flux modulator and the semi-transmissive reflective unit on an optical path of the light flux, and a position of the light flux modulator and a position of the semi-transmissive reflective unit have an imaging relationship.

7. The apparatus according to claim 1, wherein
   the image formation unit includes a light flux modulator to produce the light flux including the image information by modulating a light; and
   an optical axis of a light emitted from the light flux modulator is tilted with respect to a normal of a major surface of the light flux modulator.

8. The apparatus according to claim 7, wherein an angle between the optical axis and the normal is not less than 3 degrees and not more than 20 degrees.

9. The apparatus according to claim 1, wherein
   the image formation unit includes
   a light source including:
      a light producing device to produce a light; and
      a tapered light guide, the light produced by the light producing device being incident on the tapered light guide, and
   a light flux modulator to produce the light flux including the image information by modulating a light emitted from the tapered light guide.

10. The apparatus according to claim 9, wherein
    the tapered light guide has an emission surface opposing the light flux modulator, and
    the emission surface is tilted with respect to an optical axis of the tapered light guide.

11. The apparatus according to claim 1, wherein the semi-transmissive reflective unit includes at least one of a metal thin film and a dielectric thin film.

12. The apparatus according to claim 1, wherein the display apparatus is configure not to project the light flux on other eye of an observer having the one eye.

13. The apparatus according to claim 1, wherein
    the projection unit further includes a first light-concentrating element, a second light-concentrating element, and a reflective mirror,
    on an optical path of the light flux, the first light-concentrating element is provided between the image formation unit and the reflective mirror, the projection region limiting unit is provided between the image formation unit and the first light-concentrating element, and the second light-concentrating element is provided between the image formation unit and the projection region limiting unit, the first light-concentrating element has a first focal distance, the second light-concentrating element has a second focal distance, a distance between the projection region limiting unit and the first light-concentrating element is set to be the first focal distance, and a distance between the projection region limiting unit and the second light-concentrating element is set to be the second focal distance.

14. The apparatus according to claim 13, wherein an intermediate image is formed at a position between the reflective mirror and the first light-concentrating element, and a distance between the position. and the first light-concentrating element is the first focal distance.

15. A moving body, comprising:

a display apparatus to project a light flux including image information toward one eye; and a vehicle body, the display apparatus being mounted in the vehicle body, the display apparatus including:
   an image formation unit to emit the light flux; and
   a projection unit including:
      a projection region limiting unit to limit a width of the light flux emitted from the image formation unit, the projection region limiting unit having a reflective surface, the reflective surface having a concave configuration; and
      a semi-transmissive reflective unit to reflect the light flux emitted from the projection region limiting unit, a distance between the semi-transmissive reflective unit and an imaging plane of the light flux being not more than 250 mm.

16. The body according to claim 15, wherein the projection region limiting unit limits a width in a lateral direction of the light flux reflected by the semi-transmissive reflective unit and projected toward a human viewer to be not more than 70 mm at a position of a head of the human viewer when viewed by the human viewer.

17. The body according to claim 15, wherein the image formation unit includes a light, flux modulator to produce the light flux including the image information by modulating a light, and the projection region limiting unit is disposed between the light flux modulator and the semi-transmissive reflective unit on an optical path of the light flux, and a position of the light flux modulator and a position of the semi-transmissive reflective unit have an imaging relationship.

18. The body according to claim 15, wherein the image formation unit includes a light flux modulator to produce the light flux including the image information by modulating a light; and an optical axis of a light emitted from the light flux modulator is tilted with respect to a normal of a major surface of the light flux modulator.

19. A method comprising:

mounting a display apparatus to project a light flux including image information toward one eye with a distance between an imaging plane of the light flux emitted from the projection region limiting unit and a semi-transmissive reflective unit to reflect the light flux emitted from the projection region limiting unit being 250 mm, the display apparatus including an image formation unit and a projection unit, the image formation unit to emit the light flux, the projection unit including a projection region limiting unit to limit a width of the light flux emitted from the image formation unit, the projection region limiting unit having a reflective surface, the reflective surface having a concave configuration.

* * * * *